Patented Dec. 23, 1947

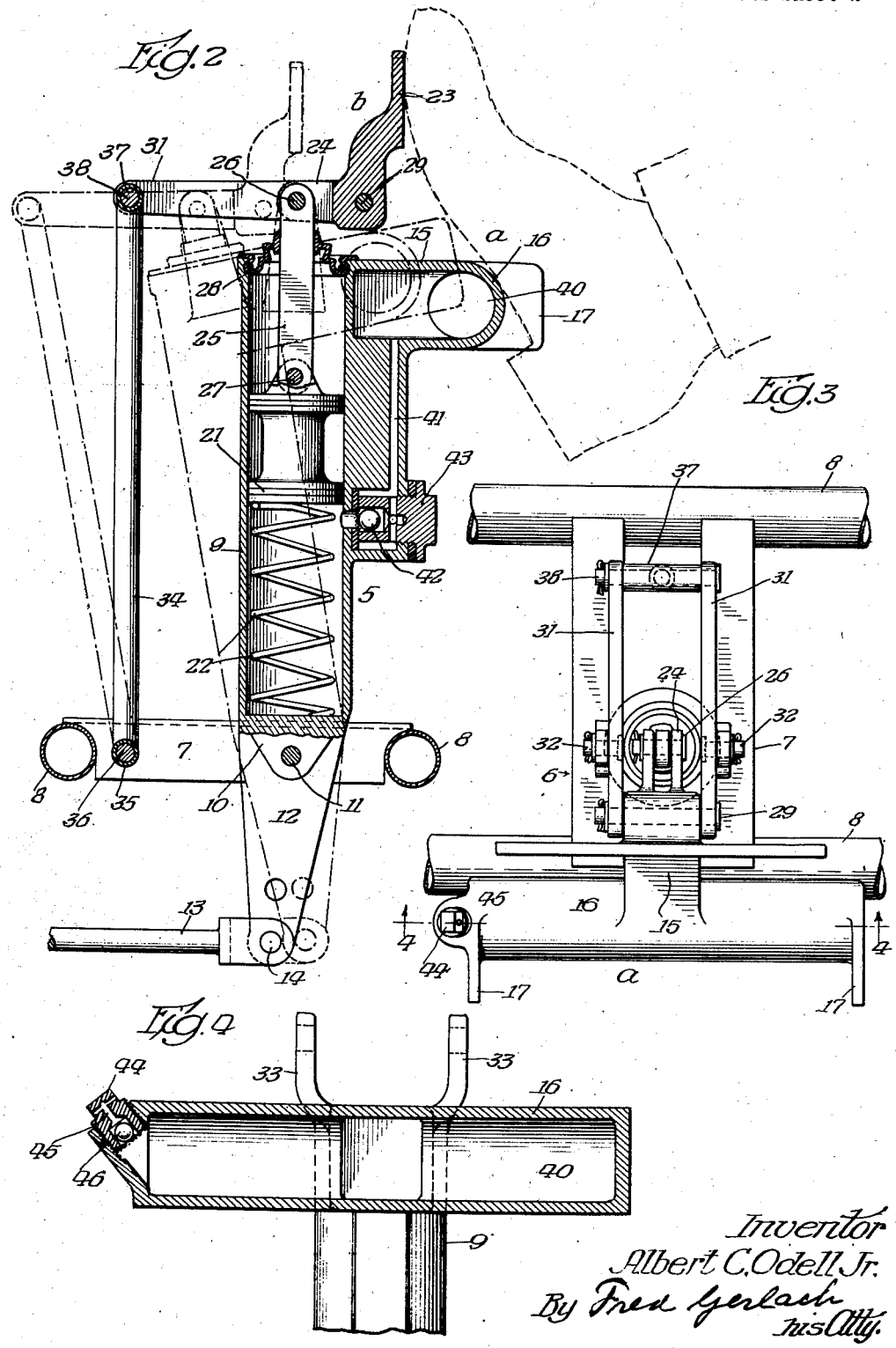

2,433,146

UNITED STATES PATENT OFFICE 2,433,146

COMBINED ACTUATING DEVICE FOR HYDRAULIC BRAKE SYSTEMS AND RUDDERS

Albert C. Odell, Jr., Wayne, Mich., assignor to Consolidated Vultee Aircraft Corporation, San Diego, Calif., a corporation of Delaware Application April 1, 1944, Serial No. 529,111

7 Claims. (Cl. 244—86)

The invention relates to combined actuating devices for hydraulic brake systems and rudders for use in aircraft.

One object of the invention is to provide a simple, compact and easily operable actuating device for a hydraulic brake system and a rudder or similar control surface for use in aircraft.

Another object of the invention is to provide an actuator of this type in which the master cylinder for braking fluid is shifted through a pedal directly attached thereto for shifting the rudder connection.

Another object of the invention is to provide an actuator of this type in which the rudder pedal is utilized as a reservoir for reserve fluid for the master cylinder for operating the braking system.

Another object of the invention is to provide an actuator of this type which comprises a brake pedal which is movable with the master cylinder of the hydraulic brake system which is shiftable by the rudder actuating pedal without energizing the fluid in the cylinder and is selectively shiftable for energizing the fluid in the cylinder.

Other objects of the invention will appear from the detailed description.

The invention consists in the several novel features hereinafter set forth and more particularly defined by claims at the conclusion hereof.

In the drawings:

Fig. 2 is a central vertical section.

Fig. 3 is a plan.

Fig. 4 is a section taken on line 4—4 of Fig. 3.

Figure 1:
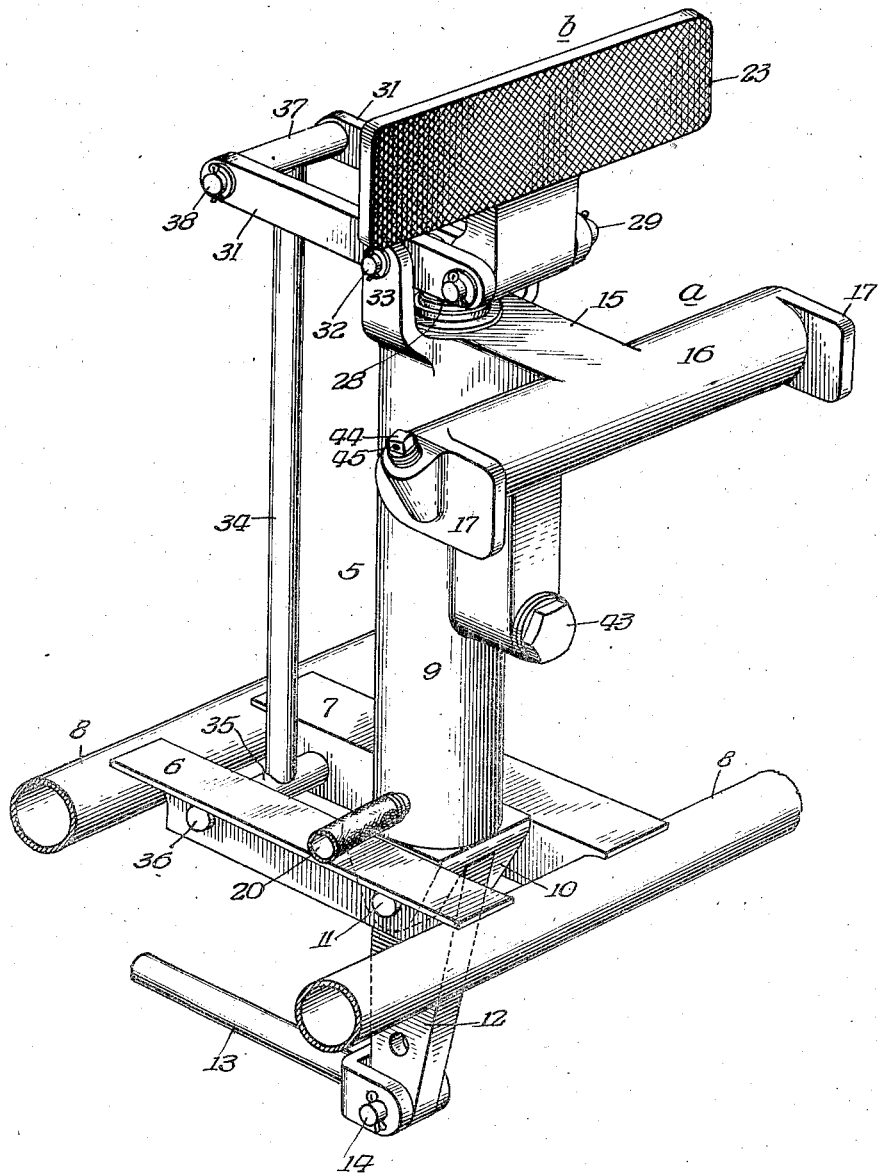
Fig. 1 is a perspective of an actuator embodying the invention.

The actuator comprises generally a pivotally movable supporting structure 5 which has integrally formed therewith a master cylinder 9 for containing hydraulic fluid which is adapted to be energized for the application of a brake or brakes, a pedal $a$ fixed to or integral with the structure for oscillating the cylinder, means on and rigid with the structure whereby a rudder-actuating connection can be shifted, and a brake pedal $b$ fulcrumed over the structure 5 and selectively operable by the toe of the pilot for energizing the fluid in the cylinder 9 for the application of the brake or brakes. The swinging movements of the structure, which includes the cylinder, shift the rudder actuating connection. The brake pedal $b$ is bodily movable with the cylinder and the rudder-actuating pedal so the brake pedal will not cause the fluid in the cylinder 9 to be energized. The brake pedal is supported from, and for selective movement relatively to, the structure 5 for energizing said fluid.

The structure 5 has integrally formed therewith the cylinder 9 for the hydraulic brake operative fluid, has an integral lug 10 at the lower end of the cylinder which fits between supporting bars 6 and 7 and the structure, and is pivotally supported by a pin 11 which extends through the lug 10 and the angle bars 6 and 7. The angle bars 6 and 7 have their ends secured, as by welding, to the tubular member 8 of the fuselage structure. The pivotal support for the structure 5 permits its upper end to swing in fore and aft directions. A downwardly extending arm 12 is integrally formed with the structure 5 and extends downwardly from lug 10 so that oscillation of said structure will rock arm 12 for shifting the rudder-actuating connection 13 which may be of any suitable character, as well understood in the art. The pedal $a$ is integrally formed, is rigid with, and preferably integral with the structure 5, and extends across the rear side of the cylinder 9 adjacent its upper end for engagement by the foot of the pilot for imparting forward swinging movement to the structure 5. The pedal $a$ comprises a hollow cross-member $a$ which functions as a foot-piece and is connected by a hollow arm 15 to the structure 5, and lugs 17 which serve as side-stops at the ends of said cross-member for the foot of the pilot. The cross-member 16, arm 15 and stop-lugs 17 are integral with the structure 5. When pedal $a$ is pushed forwardly by the pilot, the structure 5, including the cylinder 9 and the arm 15, will be oscillated on the pin 11 and shift the rudder-actuating connection 13. This exemplifies a construction in which the master cylinder for the hydraulic fluid for the brake system, the rudder actuating means and the rudder actuating pedal are fixed for conjoint pivotal movement and may be integrally formed.

A piston 21 is slidably mounted in the upper end of cylinder 9 for energizing the hydraulic fluid for actuating the brake system through a flexible pipe 20 which is connected to the lower end of said cylinder and to the hydraulically operated brake or brakes in any suitable manner as well understood in the art. A spring 22 between the lower end of piston 21 and the closed bottom end of cylinder 9 retracts the piston to release the fluid pressure in the cylinder for releasing the brakes.

The piston 21 is shiftable downwardly to energize the hydraulic fluid in the cylinder 9 by movement of the brake pedal B which is provided with an upstanding member 23 which is positioned relatively to the rudder-actuating pedal *a* so that the pilot can shift the brake pedal by the toe of his foot while it rests on the pedal *a*. The pedal *b* is also provided with a forked arm 24 which extends forwardly and has its distal end pivotally connected by a pin 26 to the upper end of a piston-operating link 25. The lower end of the link 25 is pivotally connected by a pin 27 to the upper end of the piston. Link 25 extends through and is connected to a flexible diaphragm 28 which serves as a closure for the upper end of the cylinder and permits longitudinal and swinging movements of the link in the cylinder. The brake pedal *b* is fulcrumed on a cross-pin 29 and the member 23 and arm 24 act as a bell-crank lever for shifting the piston. The fulcrum pin 29 for lever *b* is supported at the rear end of parallel horizontally extending levers 31 which are disposed at opposite sides of the arm 24 and are coaxially fulcrumed on coaxial studs 32, respectively. The studs 32 are supported in a pair of upstanding ears 33 which are integral with the pivoted supporting structure 5 of which the cylinder 9 forms a part. The levers 31 extend forwardly from fulcrum studs 32 and the pivotal movement of said levers relatively to the structure 5 is controlled by a vertically extending link 34 which may be formed of tubing. The lower end of link 34 is provided with a tubular bearing member 35 through which a cross-pin 36 extends, for pivotally connecting the lower end of link 34 to the frame bars 6 and 7 between which the structure 5 is pivotally supported. The upper end of link 34 is provided with a tubular bearing member 37 and a cross pin 38 extends through levers 31 and bearing member 37 for controlling the movement of levers 31 during the swinging movements of the structure 5 for shifting the rudder-actuating connection. The fulcrum-studs 32 for the levers 31 are supported by ears 33 which are rigid with and preferably integral with the structure 5 and cylinder 9. The ears 33 move arcuately around the center of the pivot pin 11 when the structure 5 is oscillated. The operative length of link 34 is equal to the distance between the center of fulcrum-studs 32 and pin 11 and the vertical transverse plane intersecting the cylinder 9 and pin 11 is parallel with the vertical transverse plane intersecting the pivots 36 and 38 for link 34, so that the structure 5, link 34 and levers 31 will function as a parallel linkage which will retain the levers 31 substantially horizontal during the oscillation of the structure 5 and cylinder 9 for shifting the rudder-actuating connection. The pivot pin 26 between arm 24 of the brake pedal *b* and the piston operating link 25 are normally substantially coaxial with the fulcrum studs 32 for the levers 31. As a result, the oscillation of the structure 5 will bodily move the brake pedal *b* without any rocking movement of the arm 24 on the pedal *b* so that the piston 21 will not be shifted as a result of the oscillation of the structure 5. Therefore, the normal relation between the pedal *b* and the piston 21 is maintained so that brake actuating fluid will not be energized when only the pedal *a* is pushed forwardly by the pilot. The brake pedal is thus maintained in its normal position while the pedal *a* is in its normal and all of its shifted positions. This makes it possible for the pilot, by pressing the pedal *b* forwardly with the toe of his foot, to shift the brake pedal *b* for operating arm 24 and link 25 to force the piston 21 downwardly to energize the fluid in the cylinder 9 for selectively controlling the application of the brakes when the rudder-pedal is in its normal or shifted positions or at all times.

In practice it is desirable to provide a reservoir 40 for supplying fluid to the cylinder 9 for maintaining a predetermined quantity in the cylinder and to compensate for loss by leakage. This reservoir 40 is formed in the hollow cross-member 16 of the brake pedal *a* and is adapted to retain a reserve supply of fluid. The chamber in the hollow arm 15 communicates with the reservoir 40 and with a vertical port 41. A ball check-valve 42 is confined in a plug 43 which is screw threaded to the wall of the cylinder 9. During the downward shift of the piston 21 to force the fluid from the lower end of cylinder 9 to the brake-system, the valve 42 will automatically cut off communication between the cylinder and the duct 41. When any leakage or loss of fluid occurs from that in the cylinder 9, a sufficient volume of fluid will flow, while the piston 21 is raised, from reservoir 40 through port 41 and valve 42 to the cylinder to replace the leakage or loss. A plug 44 is screw-threaded into one end of the cross-member 16 of the rudder pedal which permits the reservoir 40 to be filled with brake operating fluid. A vent-duct 45 is formed in the plug to permit the entry of air to the reservoir as the fluid flows to the cylinder. A check valve 46 is provided in the plug 44 to close the vent 45 to prevent loss of fluid from the reservoir.

The operation of the actuator will be as follows: The pilot will usually retain the rear portion of his foot on the rudder pedal *a* and when he desires to shift the rudder he will push the rudder pedal forwardly. This will oscillate the structure 5 and the cylinder 9 which are integral with the pedal on pivot-pin 11 and rock the arm 12 for shifting the rudder connection 13. When this occurs, the vertical link 34 will swing in parallelism with the cylinder 9 and the brake pedal *b*, its arm 24 and the levers 31 on which the brake pedal is fulcrumed and the pedal *b* will move forward bodily. The pin 26 between arm 24 and piston operating link 25, will remain substantially coaxial, so that the pedal *b* will not shift the piston 21. When it is desired to actuate the brake, the pilot will press his toe against the brake pedal *b* which will then fulcrum on pin 29 and rock arm 24 to shift link 25 and piston 21 downwardly to force fluid from the brake cylinder through the pipe connection 20 for applying the brakes. During this downward movement of the piston, check valve 42 will be closed to prevent back flow of the fluid to the reservoir 40. The pedal *b* may be selectively shifted by the pilot while the cylinder 9 is either in its normal position or has been oscillated to actuate the rudder connection. If any leakage occurs in the brake or the brake connection, fluid from reservoir 40 will flow, when the piston 21 is in its normal or raised position, through arm 15, port 41, and past the check-valve 42 into the cylinder to keep it filled with fluid up to the piston.

The invention exemplifies a simple and efficient combined actuator for operating a hydraulic brake and a rudder pedal which provides for the selective, independent or conjoint operation of both of the pedals. By utilizing the movable master cylinder as a support for the rudder pedal for operating the rudder connection, and the rudder pedal as a reservoir for a supply of fluid for the master cylinder, simplicity is achieved. The construction described supports the brake pedal for movement with the cylinder in its rudder-actuating movements so it remains in operative relationship to the rudder pedal for the selective operation of the brake pedal. The rudder operating arm and rudder operating pedal may be integral at all times. The formation of the parts lends itself to compactness. While the invention has been described in connection with an arm for operating a rudder-connection, it is obvious that it may also be used for operating connections on other control surfaces of an airplane, and it is to be understood that the term "rudder" is to be construed to cover such connections.

The invention is not to be understood as restricted to the details set forth since these may be modified within the scope of the appended claims without departing from the spirit and scope of the invention.

Having thus described the invention, what I claim as new and desire to secure by Letters Patent is:

1. In a combined actuator for an hydraulic brake system and a rudder for use in aircraft, a pivotally supported master cylinder for brake fluid, a piston slidably mounted in the cylinder for energizing the fluid, a connection operable by the pivotal movement of the cylinder for actuating the rudder, a pedal integral with the cylinder for pivotally shifting it and the rudder actuating-connection, a brake-pedal pivotally mounted on the distal end of the cylinder and operatively connected to the piston for actuating the brake, and a reservoir for brake-fluid formed in the pedal which is integral with the cylinder.

2. In a combined actuator for an hydraulic brake system and a rudder for use in aircraft, a master cylinder for brake fluid, pivotally supported at its lower end, a piston slidably mounted in the cylinder for energizing the brake fluid, a rudder actuating-arm rigid with the lower end of the cylinder, a pedal rigid with and for imparting pivotal movement to the cylinder and shifting the rudder actuating-arm, a pivotally movable brake-pedal mounted on the upper end of the cylinder, and a connection between the brake-pedal and the piston for operating the piston in the cylinder.

3. In a combined actuator for an hydraulic brake system and a rudder for use in aircraft, a master cylinder for brake fluid, pivotally supported at its lower end, a piston slidably mounted in the cylinder for energizing the brake fluid, a rudder actuating-arm integral with the lower end of the cylinder, a pedal rigid with and for imparting pivotal movement to the cylinder for shifting the rudder actuating-arm, and a brake-pedal mounted on the upper end of the cylinder for pivotal movement relatively to the cylinder, and a connection between the brake-pedal and the piston for operating the piston in the cylinder.

4. In a combined actuator for an hydraulic brake system and a rudder for use in aircraft, a master cylinder for brake fluid pivotally supported at its lower end, a piston slidably mounted in the cylinder for energizing the brake fluid, an arm rigid with the cylinder for shifting the rudder, a pedal rigid with the cylinder for pivotally shifting the cylinder and said arm, a brake-pedal over the cylinder, a lever fulcrummed on the cylinder and on which the brake-pedal is fulcrumed, a link pivoted to the lever to swing in substantial parallelism with the axis of the cylinder, and a connection between the brake-pedal and the piston for operating the piston in the cylinder.

5. In a combined actuator for an hydraulic brake system and a rudder for use in aircraft, a fixed support, a master cylinder for brake fluid pivotally supported at its lower end on said support, a piston slidably mounted in the cylinder for energizing the brake fluid, an arm rigid with and depending from the cylinder for shifting the rudder, a pedal rigid with the cylinder for pivotally shifting the cylinder and said arm, a brake-pedal over the cylinder, a lever fulcrumed on the cylinder and on which the brake-pedal is fulcrumed, a link having its upper end pivoted to the lever and its lower end pivoted to the fixed support, to swing in substantial parellelism with the axis of the cylinder, and a connection between the brake-pedal and the piston for operating the piston in the cylinder.

6. In a combined actuator for an hydraulic brake system and a rudder for use in aircraft, a master cylinder for brake fluid pivotally supported at its lower end, a piston slidably mounted in the cylinder for energizing the brake fluid, an arm rigid with the cylinder for shifting the rudder, a pedal rigid with the cylinder for pivotally shifting the cylinder and said arm, a transversely extending reservoir for brake fluid, integrally formed in the pedal on the cylinder, and a brake-pedal pivotally mounted on the distal end of the cylinder, and a connection between the piston and the brake-lever for shifting the piston by pivotal movement of the brake-lever relatively to the cylinder.

7. In a combined actuator for a hydraulic brake system and a rudder for use in aircraft, a vertically extending master cylinder for brake fluid pivotally supported adjacent its lower end, a piston slidably mounted in the cylinder for energizing the fluid, an arm depending from the lower portion of the cylinder for actuating the rudder, a pedal rigid with and on the upper end of the cylinder for shifting the cylinder and the arm, a brake-pedal pivotally supported above and on the upper end of the cylinder, and a connection between the piston and the brake-pedal for actuating the brake by pivotal movement of the brake-pedal on the cylinder.

ALBERT C. ODELL, JR.

REFERENCES CITED

The following references are of record in the file of this patent:

UNITED STATES PATENTS

| Number | Name | Date |
| --- | --- | --- |
| 1,978,437 | Sauzedde | Oct. 30, 1934 |
| 2,048,448 | Hofer | July 21, 1936 |
| 2,134,509 | Frank | Oct. 25, 1938 |
| 2,342,878 | Majneri | Feb. 29, 1944 |

FOREIGN PATENTS

| Number | Country | Date |
| --- | --- | --- |
| 623,784 | Germany | Jan. 4, 1936 |